(12) United States Patent
Lloyd et al.

(10) Patent No.: US 8,161,505 B2
(45) Date of Patent: Apr. 17, 2012

(54) INTERACTIVE TELEVISION SYSTEM

(75) Inventors: Jeffrey R Lloyd, Rutland, VT (US); Frank Westcott, Rutland, VT (US)

(73) Assignee: The Partnership of Jeffrey R. Lloyd and Frank Westcott, Rutland, VT (US)

( * ) Notice: Subject to any disclaimer, the term of this patent is extended or adjusted under 35 U.S.C. 154(b) by 260 days.

(21) Appl. No.: 12/342,574

(22) Filed: Dec. 23, 2008

(65) Prior Publication Data
US 2009/0172721 A1 Jul. 2, 2009

Related U.S. Application Data

(60) Provisional application No. 61/009,565, filed on Dec. 31, 2007.

(51) Int. Cl.
*H04N 7/16* (2011.01)
*H04N 7/10* (2006.01)
(52) U.S. Cl. ............... 725/23; 725/2; 725/32; 725/151
(58) Field of Classification Search ............ 725/2, 6, 725/23, 32, 106, 111; 705/14, 14.58, 26, 705/27; 348/473
See application file for complete search history.

(56) References Cited

U.S. PATENT DOCUMENTS

| | | | | |
|---|---|---|---|---|
| 5,703,795 | A | * | 12/1997 | Mankovitz ............ 715/721 |
| RE38,600 | E | * | 9/2004 | Mankovitz ............ 348/473 |
| 7,729,945 | B1 | * | 6/2010 | Katz et al. ............ 705/26.1 |

* cited by examiner

*Primary Examiner* — Kieu Oanh T Bui
(74) *Attorney, Agent, or Firm* — James Marc Leas (57) ABSTRACT

A method includes, providing a television, a reading device, an input device, and a printer. The reading device is connected to receive a digital signal transmitted by a television signal provider. The reading device is connected to provide a first output signal to the television and a second output signal to the printer under control of the input device. The method includes receiving a digital signal with the reading device wherein the digital signal is transmitted by the television signal provider. It also includes sending the first output signal from the reading device to the television for display to a viewer. If the viewer uses the input device to choose to print, it also includes printing information provided in the second output signal.

27 Claims, 7 Drawing Sheets

INTERACTIVE TELEVISION SYSTEM

RELATED PATENT APPLICATIONS AND PRIORITY

This application claims priority of Provisional Patent Application No. 61/009,565, filed Dec. 31, 2007, incorporated herein by reference.

FIELD

This patent application generally relates to an interactive television system. More particularly, it relates to a system for distributing useful information to viewers and for receiving information from viewers. Even more particularly, it relates to a system in which viewers can choose to receive printed information.

BACKGROUND

Viewers have long sought ways of avoiding advertisements on TV, such as by changing channels or by recording shows and fast forwarding through commercials. To counter this advertisers have sought ways to maintain viewer interest in their advertisements. In addition advertisers have sought ways to determine the effectiveness of their advertisements. The present applicants recognized a better scheme to maintain viewer interest and to provide information back to advertisers indicating the effectiveness of particular advertisements, and this solution is provided in the following description.

SUMMARY

One aspect of the present patent application is a method that includes providing a television, a reading device, an input device, and a printer. The reading device is connected to receive a digital signal transmitted by a television signal provider. The reading device is connected to provide a first output signal to the television and a second output signal to the printer under control of the input device. The method includes receiving a digital signal with the reading device wherein the digital signal is transmitted by the television signal provider. It also includes sending the first output signal from the reading device to the television for display to a viewer. If the viewer uses the input device to choose to print, it also includes printing information provided in the second output signal.

Another aspect is a computer-usable medium having computer readable instructions stored thereon for execution by a processor to corresponding to the above method.

BRIEF DESCRIPTION OF THE DRAWINGS

The foregoing will be apparent from the following detailed description, as illustrated in the accompanying drawings, in which.

DETAILED DESCRIPTION

In one embodiment, the present applicants provide an interactive television system that allows a viewer to choose to print information related to an advertisement broadcast on television. The printed information can include coupons, recipes, prize certificates, or other printed attractions. In one embodiment, the interested viewer presses the select button on a remote control device to initiate the printing. In a further embodiment, the fact that the viewer pressed the select button to receive the printed information is stored for transmission back to the advertiser. Associated information, such as the particular advertisement, the advertiser, the name of the television show being watched, the date, and the time, is also stored for transmission back to the advertiser. In another embodiment, this associated information is printed on the coupon. The associated information may be printed on the coupon as a code, such as a bar code. When the customer uses the coupon to purchase the advertised product or service, the information on the bar code is retrieved for transmission to the advertiser. Thus, the advertiser gets feedback showing the success of the particular advertisement.

Figure 1:
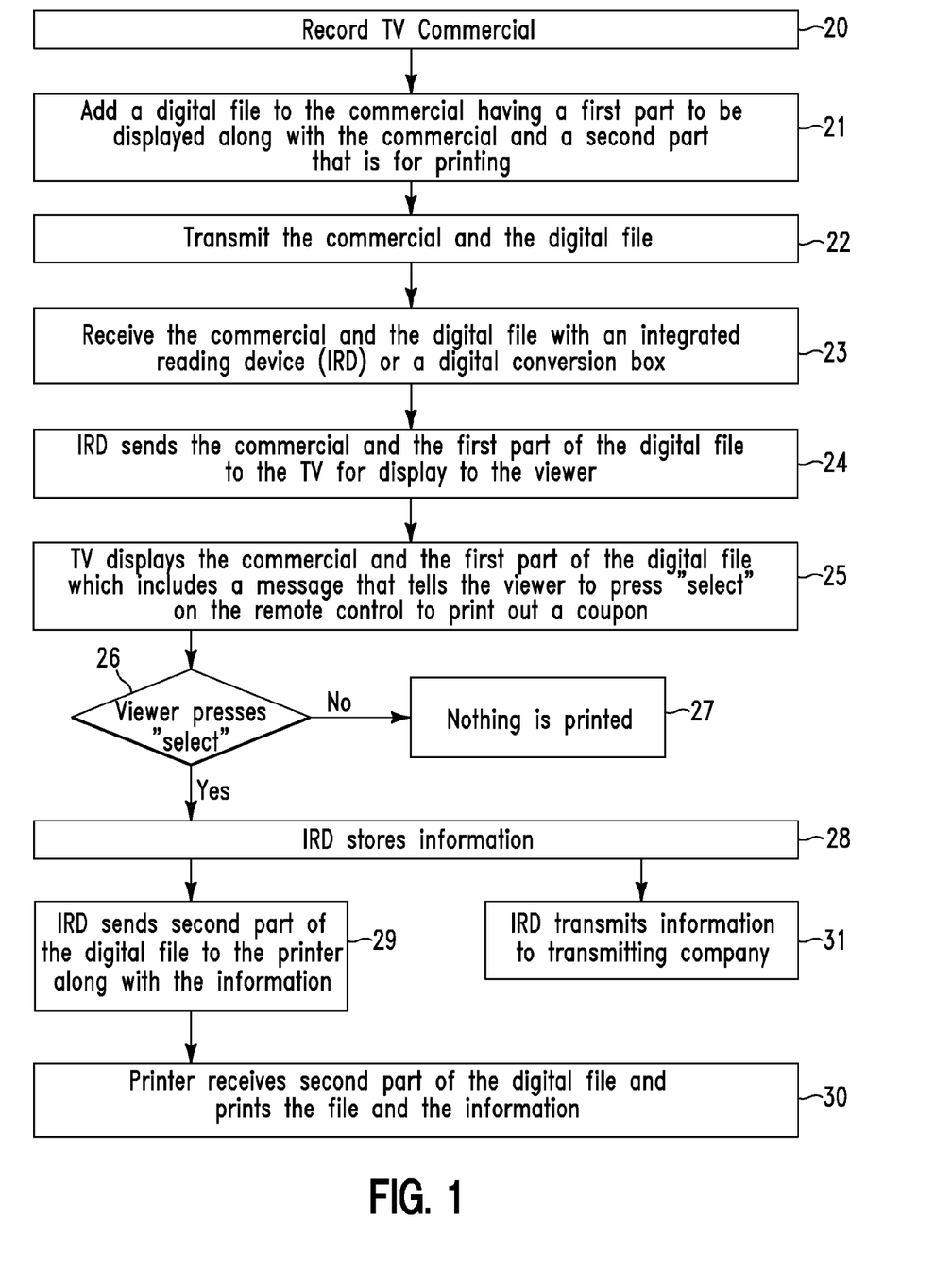
FIG. 1 is a flow chart illustrating a process that allows a viewer to choose to print information related to an advertisement broadcast on television.
Figure 2:
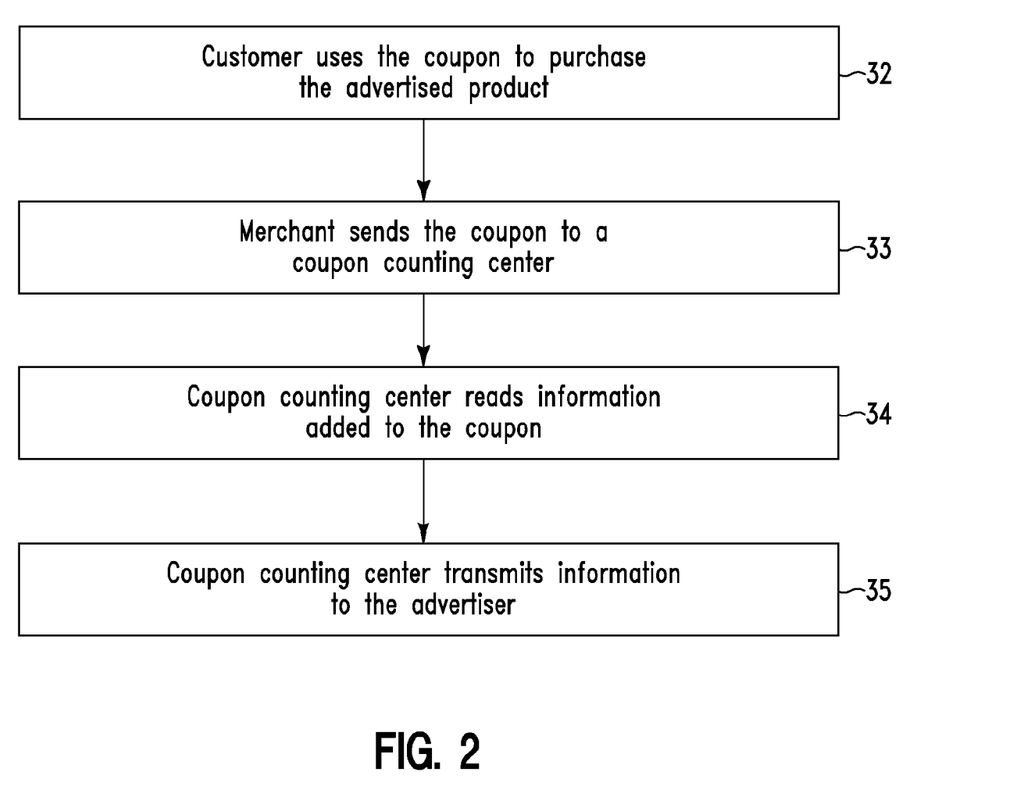
FIG. 2 is a flow chart illustrating a process in which a customer uses a coupon printed out according to the process of FIG. 1.
Figure 3A:
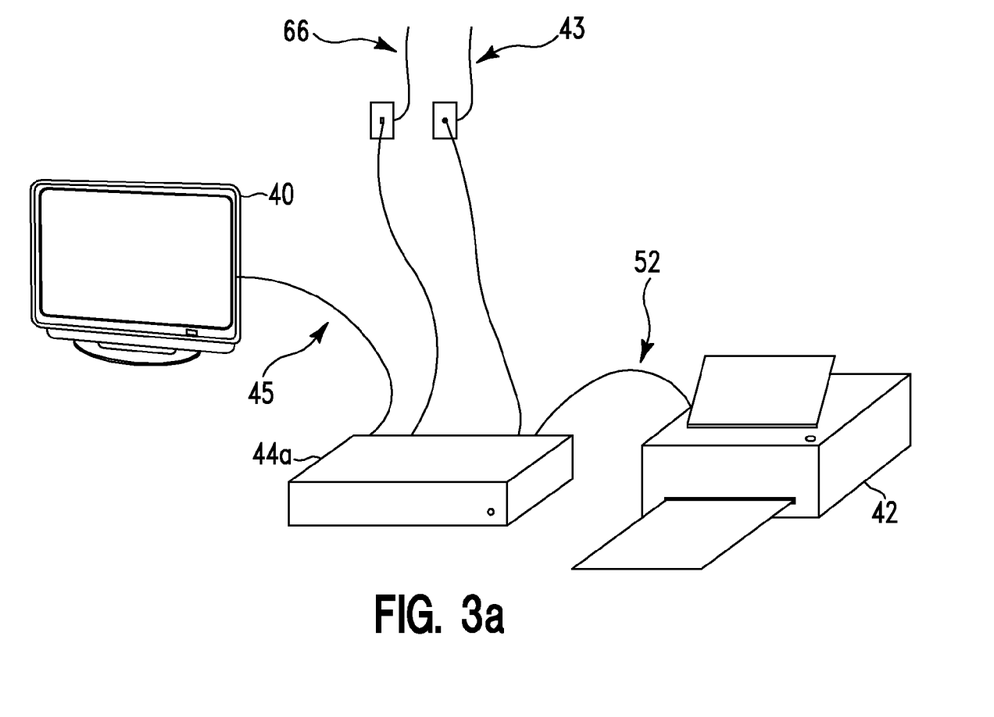
FIG. 3a illustrates an embodiment in which a reading device is connected to a source of transmitted television signal, a television, a printer, and a phone line.

Various embodiments of the present system are illustrated in the flow charts of FIGS. 1 and 2. In one embodiment, a television advertisement, or a "commercial," is recorded in a television studio, as shown in box 20 of FIG. 1. A digital file is included with the advertisement. This digital file has a first part to be displayed along with the advertisement on television 40, as shown in FIG. 3a. The digital file has a second part that is for printing on printer 42, as shown in box 21. The advertisement and the digital file are transmitted by the source of television transmission to television viewers over cable 43, as shown in box 22. Satellite or airwaves transmission can also be used.

Figure 3B:
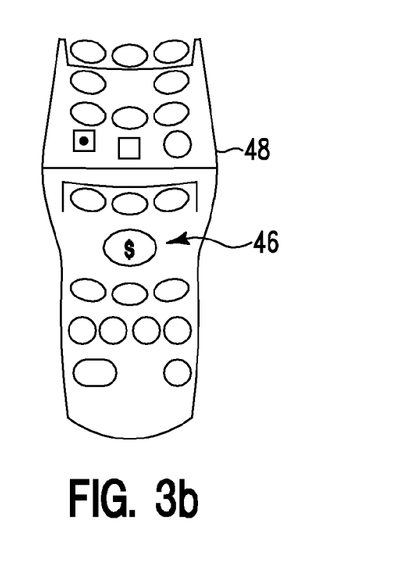
FIG. 3b illustrates a remote control for controlling the system of FIG. 3a, including a select button for initiating printing information related to an advertisement.

A viewer receives the advertisement and the digital file with reading device 44a, such as an integrated reading device (IRD) or any other digital conversion box, as shown in box 23. Reading device 44a sends the advertisement and the first part of the digital file to television 40 over connector 45 for audio and visual display to the viewer, as shown in box 24. Television 40 displays the advertisement and the first part of the digital file, as shown in box 25. In this embodiment, the display of the first part of the digital file includes a message that tells the viewer to press "select" button 46 on remote control 48, as shown in FIG. 3b, if he or she wishes to print out a coupon. Any other button on remote control 48 can be assigned for this task or a special print button can be designated. The message on the television display may be in the form of a recognizable icon. It may also have a text message, such as "press select to print $1.00 off coupon."

The viewer has the choice as to whether or not to press "select" button 46 on remote control 48, as shown in box 26.

If the viewer does not press "select" button 46 nothing is printed, as shown in box 27. If the viewer presses "select," reading device 44a stores associated information, as shown in box 28, and sends the second part of the digital file to printer 42, as shown in box 29. The second part of the digital file includes the digital code for the coupon. This code may provide image or text.

Figure 4A:
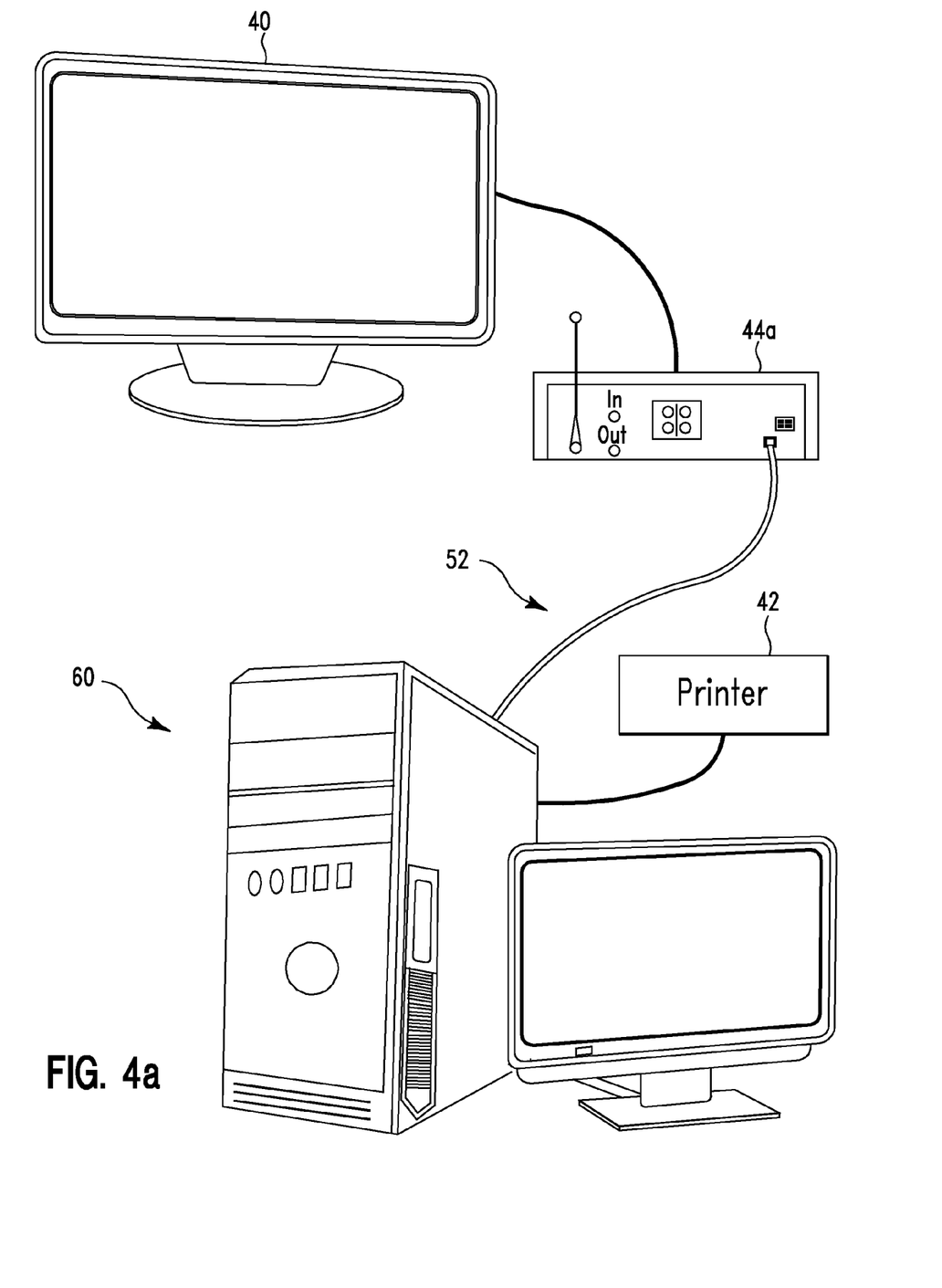
FIG. 4a illustrates an embodiment in which a reading device is connected to a television and a computer, and the reading device is wire-connected to the computer.
Figure 4B:
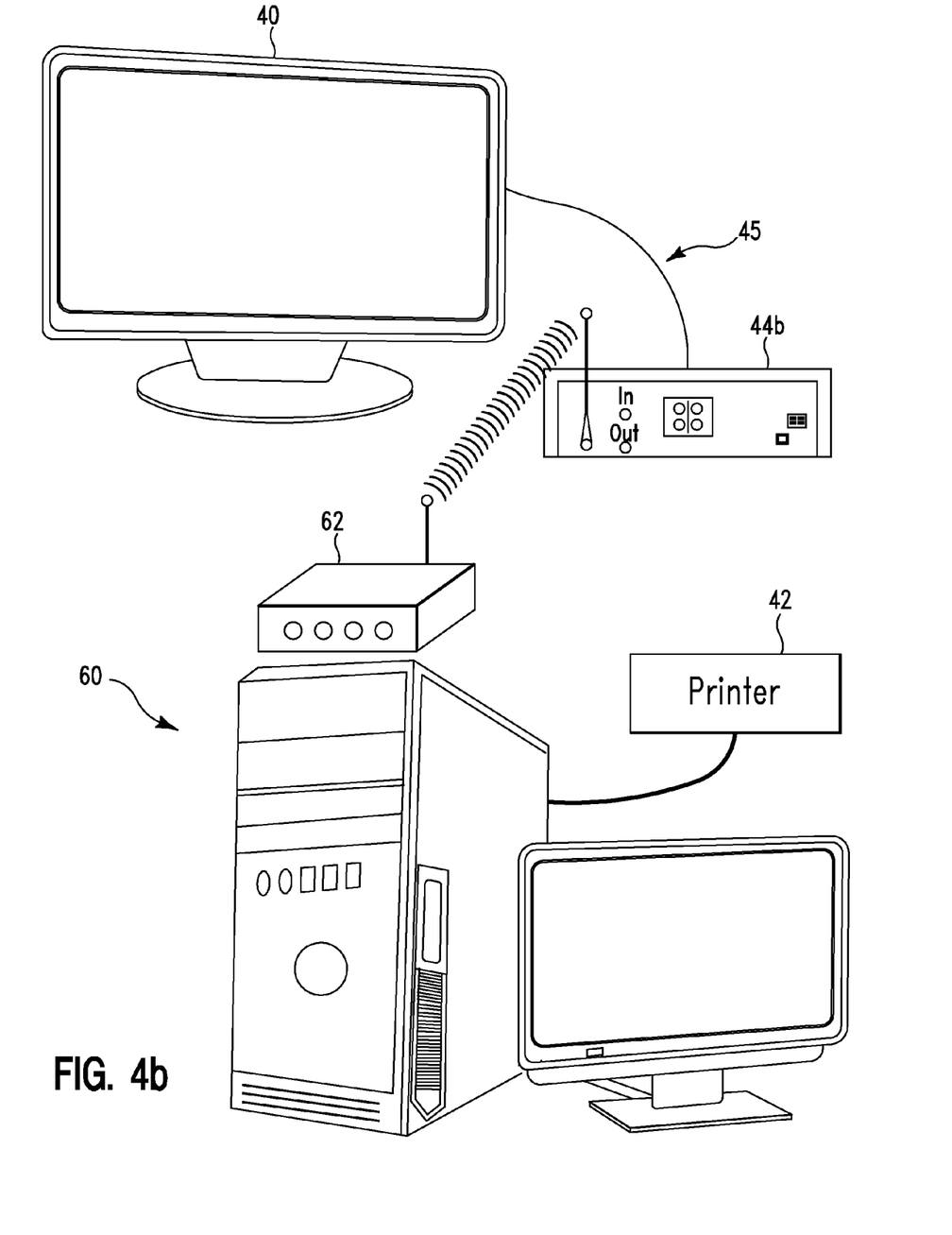
FIG. 4b illustrates an embodiment similar to the embodiment of FIG. 4a except the reading device is wirelessly connected to the computer.
Figure 5A:
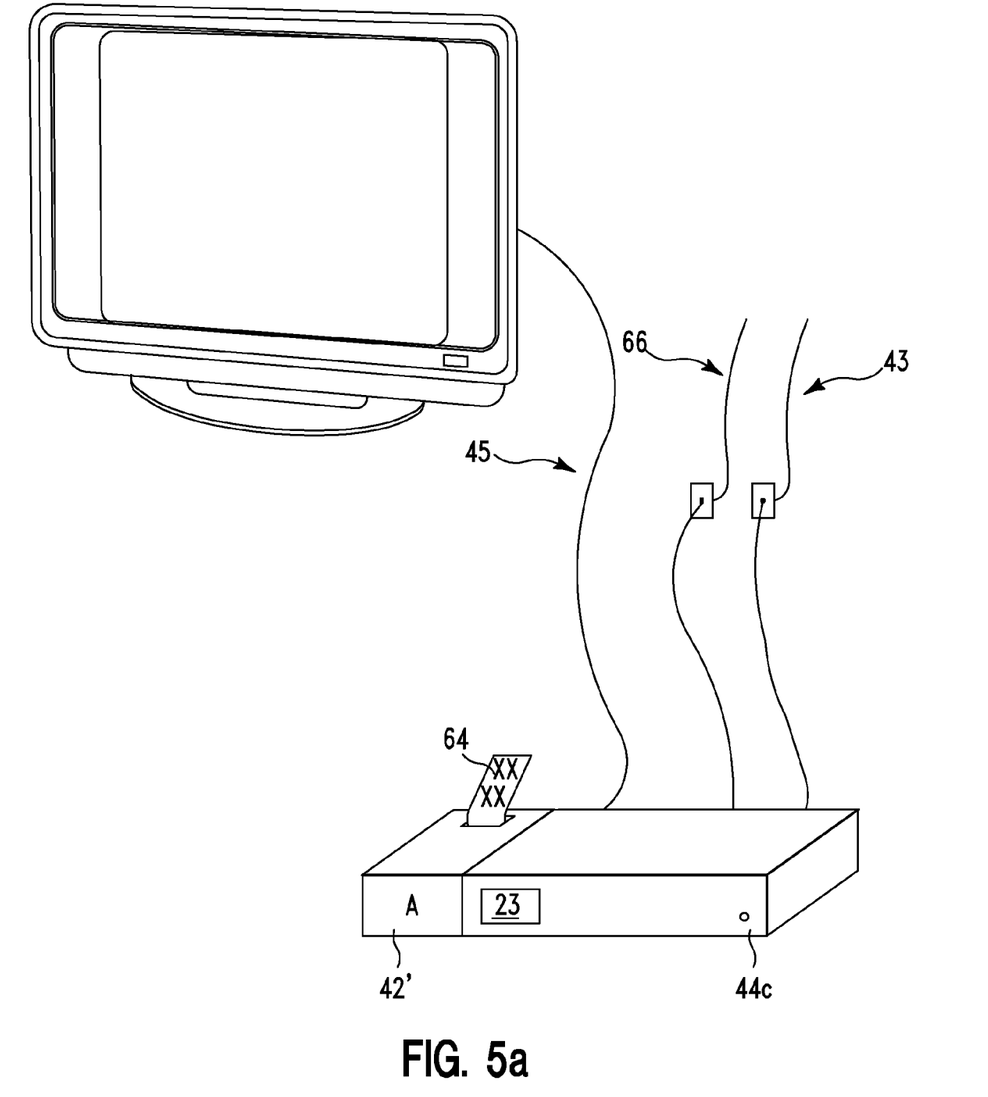
FIG. 5a illustrates an embodiment similar to the embodiment of FIG. 3 except the reading device includes the printer.
Figure 5B:
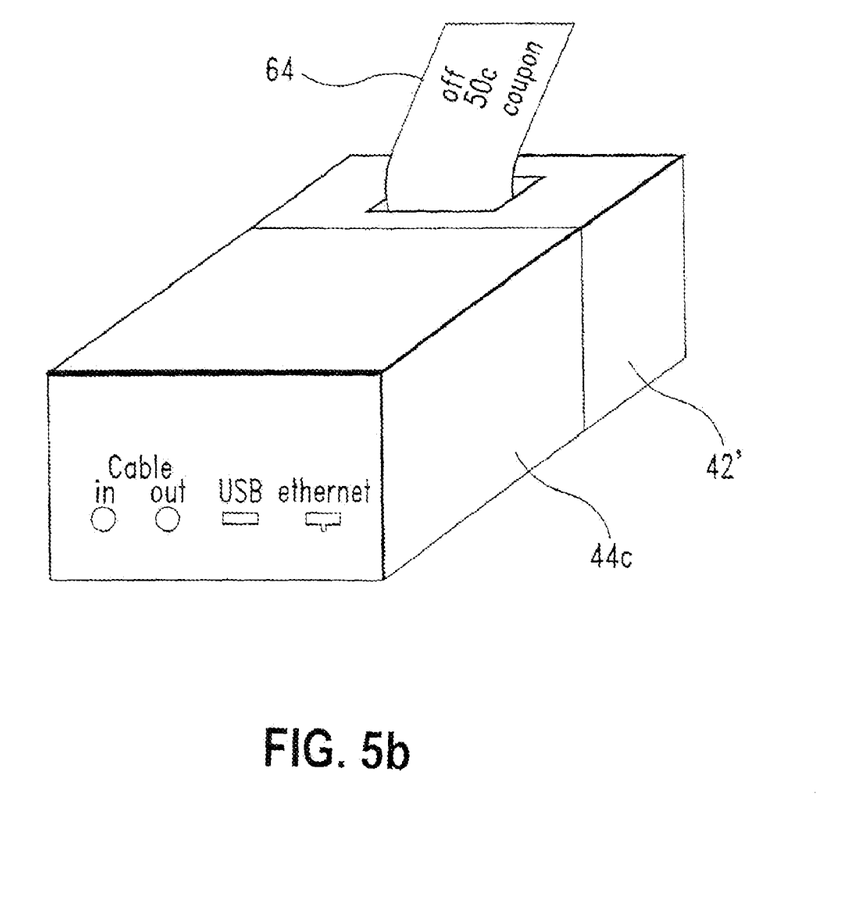
FIG. 5b illustrates an enlarged view of the reading device of FIG. 5a and its printer.

Connection to printer 42a may be by way of cable 52, such as an ethernet or USB cable, as shown in FIG. 3a. In this embodiment printer 42 is directly connected to reading device 44a. Alternatively, reading device 44a, 44b and computer 60 may be members of a wired or wireless network, as shown in FIGS. 4a, 4b, while printer 42 is connected to computer 60. The wireless network includes reading device 44b wirelessly communicating with computer 60 through wireless router 62. In another embodiment, printer 42' is integrated in one box with reading device 44c, as shown in FIGS. 5a, 5b. In another embodiment, the reading device is integrated in one unit with the television (not shown).

Printer 42, 42' receives the second part of the digital file and prints coupon 64 along with the associated information, as shown in box 30.

At the same time coupon 64 is printed, or at another time, reading device 44a, 44b, 44c transmits the advertisement information and the associated information to the cable, satellite, or broadcast company or to another company designated for receiving such information, as shown in box 31. In one embodiment, reading device 44a, 44b, 44c has a modem (not shown) and transmits the associated information with telephone line 66. Other transmission schemes can be used, such as through an internet connection. Transmission of the advertisement information and the associated information may be on a schedule, such as once per day or it can be after each coupon or several coupons have been printed by the viewer.

The viewer who printed out coupon 64 can now use coupon 64 to purchase the advertised product or service, as shown in box 32 of FIG. 2. In one embodiment, the merchant receiving coupon 64 sends coupon 64 to a coupon counting center, as shown in box 33. The coupon counting center reads the advertisement and associated information printed on coupon 64, as shown in box 34, and transmits that information to the advertiser, as shown in box 35. Thus, the viewer receives the benefit of coupon 64 and the advertiser receives information about an advertisement that was effective to produce a purchase.

While the system of the present patent application has been described in terms of television advertisements and coupons, it is also useful for other television applications that involve the choice of printing material that may be described during a television program or during an advertisement, such as travel brochures, instructions, cooking recipes, political platforms, posters, flyers, and educational materials. For some of these applications, storage of associated information and feedback to the provider may be included and for others these features may be omitted. Other applications include providing forms for printing, for example for polling viewers. For children's programs, cartoons, games, and coloring pages can be provided for printing. Along with recipes coupons may be provided for certain ingredients. Non coupon related advertising may also be provided for printing, such as phone number, web address, other contact information, product image, and product description. Other applications include providing pictures of celebrities. Other applications allow interaction with the television program through printing out material or certificates for prizes or free samples. For example, shows relating to hunting or fishing may provide a list of useful tips that can be sent to the printer. Similarly, sports programs can provide game schedules, race schedules, participants, and race results for printing. Hobby shows can provide instructions and materials lists for viewers to print so they can acquire the materials before the next show. And gaming shows can provide cheats and codes for printing.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A method for a television signal provider to provide information to a viewer having a reading device, a television, an input device, and an output device, comprising:
   a. transmitting a digital signal from the television signal provider to the reading device, wherein said digital signal includes a first part and a second part, wherein said first part includes information for display on the television and wherein said second part includes information that when communicated to the output device provides at least one from the group consisting of image and text, wherein the reading device is at least one from the group consisting of directly connected to the output device, a member of a wired or wireless network that communicates with the output device, and integrated in one box with the output device for communication with the output device;
   b. providing the reading device so when the reading device receives the digital signal transmitted by the television signal provider, the reading device sends a first output signal from the reading device to the television for display to the viewer, wherein said first output signal includes information derived from said first part; and
   c. providing the reading device so if the viewer presses on the input device the reading device responds to said pressing by communicating a second output signal from the reading device to the output device, wherein said second output signal includes information derived from said second part for said output device to provide said at least one from the group consisting of image and text.

2. The method as recited in claim 1, wherein said output device includes a printer, and printing information derived from said second part to provide said at least one from the group consisting of image and text.

3. The method as recited in claim 2, wherein said first output signal includes a message inviting the viewer to use said input device to choose to print.

4. The method as recited in claim 2, further comprising storing information related to at least one from the group consisting of said first output signal and said second output signal if the viewer uses said input device to choose to print.

5. The method as recited in claim 4, further comprising storing information related to at least one from the group consisting of the particular advertisement, the advertiser, the name of television program, date, time.

6. The method as recited in claim 4, further comprising transmitting said stored information.

7. The method as recited in claim 6, further comprising providing a modem and a telephone line, wherein said transmitting involves using said modem and said telephone line for said transmitting said stored information.

8. The method as recited in claim 2, wherein said printing involves printing said information as a bar code.

9. The method as recited in claim 2, wherein said reading device is wirelessly connected for communication with said printer.

10. The method as recited in claim 1, wherein said first output signal includes an advertisement.

11. The method as recited in claim 1, wherein said second output signal includes at least one from the group consisting of a coupon, a recipe, an instruction, a brochure, a political platform, and educational material.

12. The method as recited in claim 11, wherein said digital signal transmitted by the television signal provider includes an advertisement from an advertiser, wherein said coupon includes information, further comprising using said coupon when purchasing, and further comprising providing information from said coupon to the advertiser.

13. The method as recited in claim 12, wherein said information includes at least one from the group consisting of name of television program, date, time, and receiver identity.

14. The method as recited in claim 1, wherein said pressing on said input device involves pressing a button on said input device.

15. A computer-usable medium having computer readable instructions stored thereon for execution by a processor to perform a method for a television signal provider to provide information to a viewer having a reading device, a television, a remote control device, and a printer, comprising:
  a. receiving a digital signal transmitted by a television signal provider with a reading device, wherein said digital signal includes a first part and a second part, wherein said first part includes information for display on the television and wherein said second part includes information for printing by the printer, wherein said reading device is connected to provide a first output signal to the television and a second output signal to the printer under control of the input device, wherein the reading device is at least one from the group consisting of directly connected to said printer, a member of a wired or wireless network that communicates with said printer, and integrated in one box with said printer for communication with said printer;
  b. providing the reading device so when the reading device receives the digital signal from the television signal provider the reading device sends said first output signal from said reading device to said television for display to a viewer, wherein said first output signal includes information derived from said first part; and
  c. providing the reading device so if the viewer presses on said input device said reading device responds to said pressing by providing said second output signal from the reading device to said printer, wherein said second output signal includes information derived from said second part, and printing based on said information in said second output signal.

16. The method as recited in claim 15, wherein said pressing on said input device involves pressing a button on said input device.

17. A method for a television signal provider to provide information to a viewer having a reading device, a television, a remote control device, and a printer, comprising:
  a. transmitting a digital signal from the television signal provider to said reading device, wherein said digital signal includes a first part and a second part, wherein said first part includes information for display on the television and wherein said second part includes information for printing by the printer, wherein said reading device is connected to provide a first output signal to said television and a second output signal to said printer, wherein said second output signal is provided to said printer under control of said remote control device, wherein the reading device is at least one from the group consisting of directly connected to said printer, a member of a wired or wireless network that communicates with said printer, and integrated in one box with said printer for communication with said printer;
  b. providing the reading device so when the reading device receives the digital signal from the television signal provider the reading device sends said first output signal from said reading device to said television for display to a viewer, wherein said first output signal includes information derived from said first part; and
  c. providing the reading device so if a viewer presses on the input device the reading device responds to said pressing by providing said second output signal from said reading device to said printer, wherein said second output signal includes information derived from said second part, and printing based on said information in said second output signal.

18. The method as recited in claim 17, wherein said printing said information includes printing at least one from the group consisting of a coupon, a recipe, an instruction, a brochure, a political platform, and educational material.

19. The method as recited in claim 17, wherein said using said remote control device to send a signal indicating a desire to print information related to said output signal involves printing information already available at said reading device.

20. The method as recited in claim 17, wherein said pressing on said input device involves pressing a button on said input device.

21. The method as recited in claim 17, wherein said reading device is wirelessly connected to provide an output signal to said printer.

22. A method for a television signal provider to provide information to a viewer having a reading device, a television, a remote control device, and a printer, comprising:
  a. transmitting a digital signal from the television signal provider to the reading device, wherein said digital signal includes a first part and a second part, wherein said first part includes information for display on the television and wherein said second part includes information for printing by the printer, wherein the reading device is at least one from the group consisting of directly connected to said printer, a member of a wired or wireless network that communicates with said printer, and integrated in one box with said printer for communication with said printer;
  b. providing the reading device so when the reading device receives the digital signal from the television signal provider the reading device sends said first output signal from said reading device to said television for display to a viewer, wherein said first output signal includes information derived from said first part; and
  c. providing the reading device so if a viewer presses on said remote control device said reading device responds to said pressing by providing said second output signal from the reading device to said printer wherein said second output signal includes digital code for information derived from the second part; and
  d. receiving said digital code for said information with said printer.

23. The method as recited in claim 22, further comprising using said digital code for printing said information.

24. The method as recited in claim 22, wherein said information includes at least one from the group consisting of a coupon, a recipe, an instruction, a brochure, a political platform, and educational material.

25. The method as recited in claim 22, wherein said receiving digital code for said information precedes using said remote control device to send a signal indicating a desire for said information.

26. The method as recited in claim 22, wherein said pressing on said input device involves pressing a button on said input device.

27. The method as recited in claim 22, wherein said reading device is wirelessly connected to provide an output signal to said printer.

* * * * *